United States Patent

Cazabon et al.

[15] 3,672,625
[45] June 27, 1972

[54] POSITION LOCATOR FOR AN ADJUSTABLE SEAT SUPPORTING ASSEMBLY

[72] Inventors: Dennis C. Cazabon, Grosse Pointe; John R. Dunbar, Dearborn, both of Mich.

[73] Assignee: Ford Motor Company, Dearborn, Mich.

[22] Filed: March 1, 1971

[21] Appl. No.: 120,025

[52] U.S. Cl. ............................................................ 248/429
[51] Int. Cl. ........................................................... B60n 1/08
[58] Field of Search .................. 248/393, 424, 420, 429, 430; 296/65; 297/311, 340, 344

[56] References Cited

UNITED STATES PATENTS

| 1,987,431 | 1/1935 | Browne | 248/430 |
| 3,013,763 | 12/1961 | Weberman | 248/429 |
| 3,044,829 | 7/1962 | Dolgorukov | 297/344 |
| 3,076,629 | 2/1963 | Henry-Biadaud | 248/424 |
| 3,278,223 | 10/1966 | Panhard | 248/430 |

FOREIGN PATENTS OR APPLICATIONS

| 13,033 | 5/1914 | Great Britain | 297/311 |
| 566,665 | 11/1958 | Canada | 248/430 |

Primary Examiner—Marion Parsons, Jr
Attorney—John R. Faulkner and William E. Johnson

[57] ABSTRACT

A position locator for an adjustable seat supporting assembly includes a guide rail over which a seat supporting channel is movable. Structure is provided on the channel to function with a locator plate formed with the guide rail so that the seat channel is adjustable between a plurality of different positions. Structure is also provided that positively locates front and rear positions for the seat supporting channel. This structure is actuated by a device which permits one to move the seat directly to either the front or the rear position and then to lock the seat in such a position. With the position locator, one driver of a vehicle containing the seat may move the seat to the rear position and another driver may move the seat to the front position.

10 Claims, 8 Drawing Figures

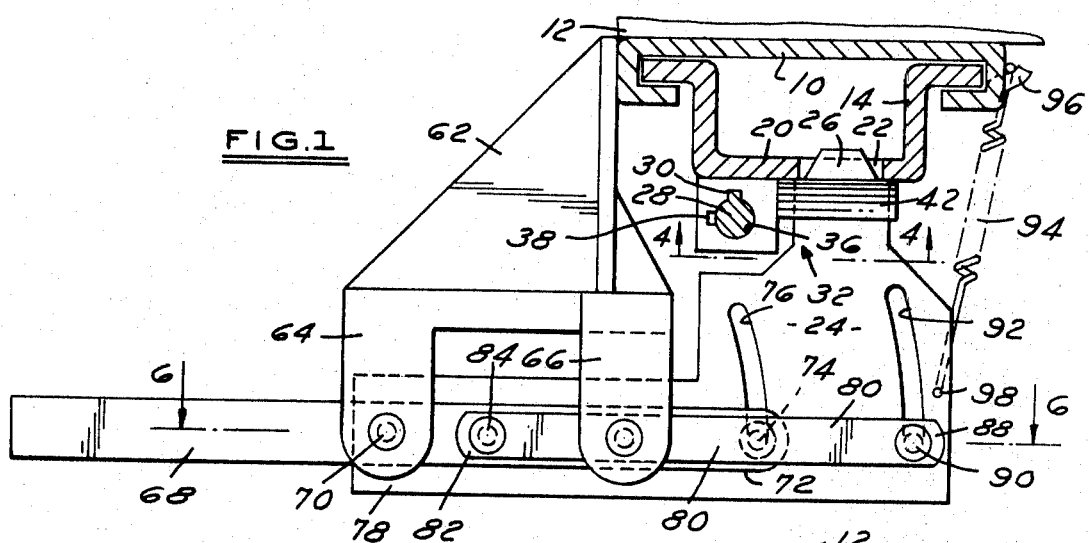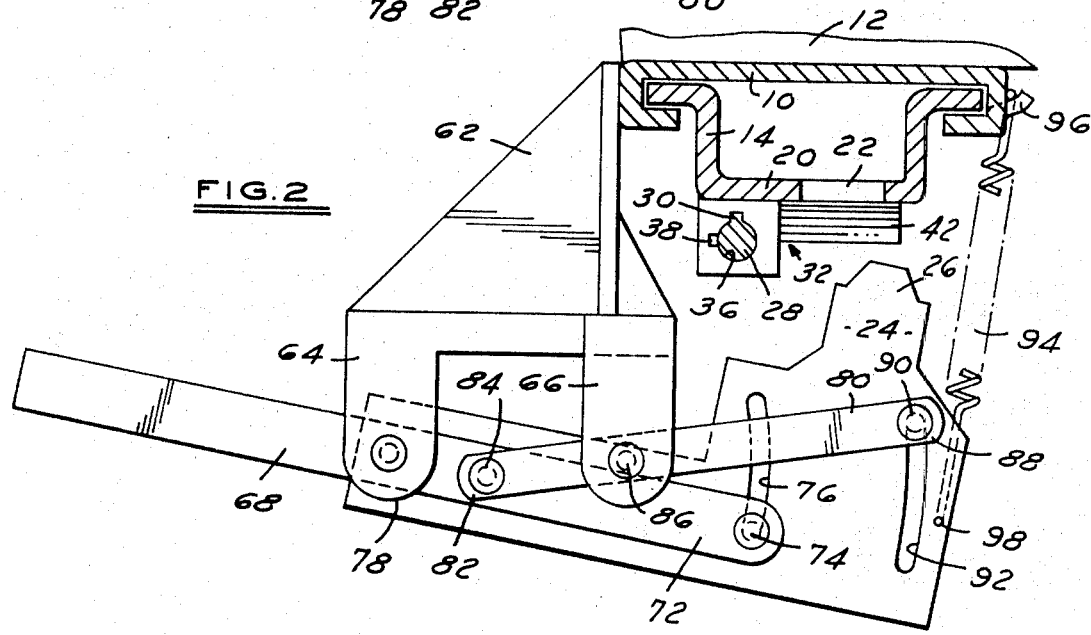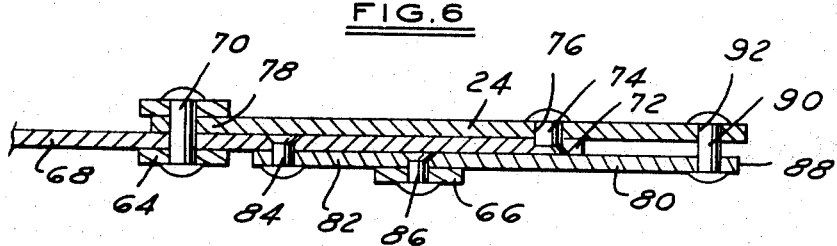

INVENTORS
DENNIS C. CAZABON
JOHN R. DUNBAR
BY John R. Faulkner
William E. Johnson
ATTORNEYS

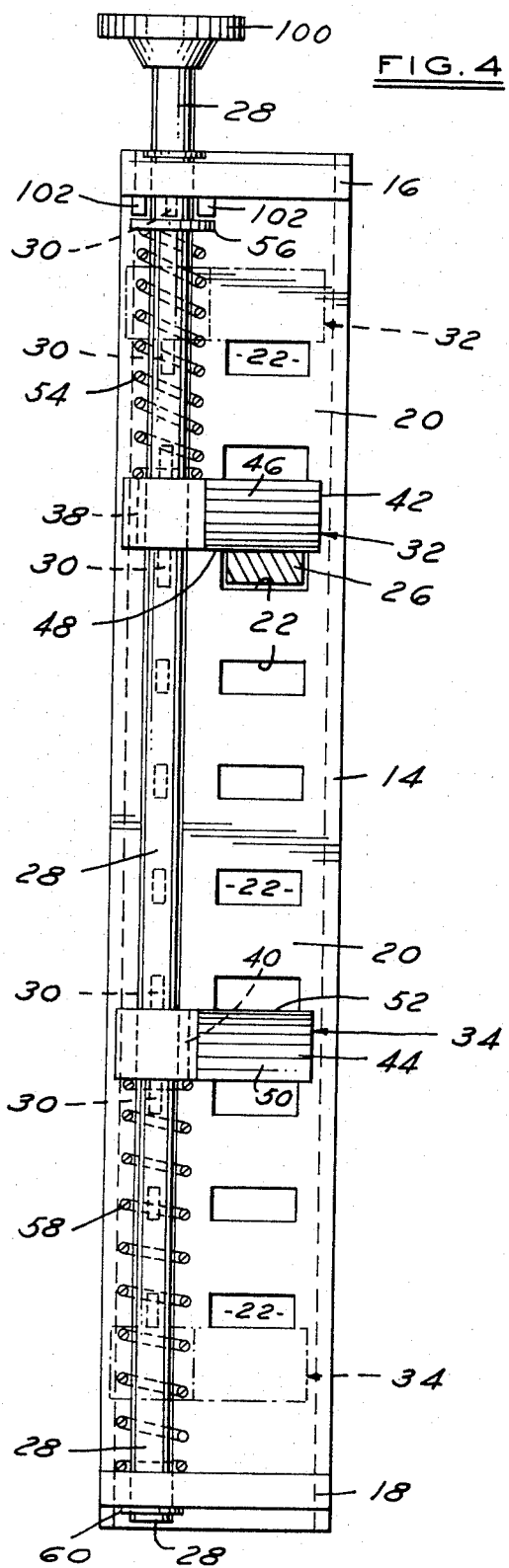

POSITION LOCATOR FOR AN ADJUSTABLE SEAT SUPPORTING ASSEMBLY

BACKGROUND OF THE INVENTION

A driver's seat or a front seat of a motor vehicle is generally adjustable to a number of positions. The most common type of vehicle seat structure permits movement of the seat from a rear position along an axis to a front position. Also the common type of a seat structure provides a device thereon which locks the seat in any one of a number of different positions along its axis of movement.

In most cases, a motor vehicle owned by a family is operated by several members of the family such as the husband and the wife. Generally, the husband is taller and operates the vehicle with the seat positioned near one of its rear positions. On the other hand, the wife, who is generally shorter then the husband, operates the vehicle with the seat positioned near one of its front positions.

The seat structure generally provided in today's motor vehicle permits adjustment of the seat along an axis. Thus, the husband may move the vehicle seat to one of its rear positions and the wife may move the seat to one of its front positions. However, upon each change in position of the vehicle seat, the exact desired position for the husband or wife must be sought for. In other words, if the wife enters the vehicle when the seat is in a rear position, the wife will slide the seat forward. By a hunt and seek process, the wife will adjust the seat until she once again finds that position which is most comfortable for her.

This invention is directed to a structure which is employed with an adjustable seat supporting mechanism of the type above described. The main purpose of the structure of this invention is to provide positively located front and rear positions which may be used by two different operators of the same motor vehicle. With the inventive structure, the vehicle seat may be rapidly adjusted from one position to another with a minimum of effort. The vehicle operator also will be assured of achieving a preselected seat position each time the structure is employed. The inventive structure is so designed that a seat associated therewith also may be moved to positions other than the front and the rear positions.

SUMMARY OF THE INVENTION

This invention relates to a position locator for an adjustable seat supporting assembly and, more particularly, to a position locator for an adjustable seat supporting assembly of a motor vehicle in which the seat may be moved between two preselected positions and may be locked in such preselected positions.

The position locator for an adjustable seat supporting assembly formed in accordance with the teachings of this invention includes a guide rail and structure for supporting the guide rail in a position so that a seat supporting channel may move therealong. The seat supporting channel supports a vehicle seat in which an operator of the motor vehicle is seated. A position location plate is supported by the supporting structure adjacent the guide rail. This position location plate has a plurality of location positions thereon spaced equally along its length. A locator pin device is provided for association with a selected one of the location positions of the locator plate.

A shaft, rotatably supported on the support structure, extends along the length of the guide rail. A plurality of spacing blocks are aligned in a single row along the length of the shaft. These blocks are spaced apart from one another by distances approximating the spacing of the location positions of the locator plate.

A pair of locator members are received on the shaft. These members are formed so as to have several features. The members have a thickness less than the dimension of the space between adjacent ones of the spacing blocks of the shaft so that the members are positionable between adjacent ones of the spacing blocks. The members also have a central opening therethrough of a diameter slightly larger than the diameter of the shaft. Each of the members also has a secondary opening connected to its central opening. The secondary openings are of sufficient size to permit movement of the spacing blocks therethrough thus permitting the shifting of the members along the length of the shaft when the shaft's spacing blocks are aligned with the secondary openings.

Each member also has a projecting portion which extends to a position in juxtaposition with a portion of the position locating plate having the location positions thereon. The positioning of the projecting portion with respect to the position location plate acts to retain the locator members in a fixed attitude with respect to the location plate even though the shaft is rotated in the central opening thereof. The projecting portion of each member also directs the locator pin device into association with a selected one of the locator positions of the locator plate to lock the seat channel in a fixed position.

The secondary openings of the locator members are not aligned with one another when the members are on the shaft. This misalignment requires the shaft to be moved to one angular attitude to permit movement of one locator member therealong and requires movement of the shaft to another angular attitude to permit movement of the other locator member therealong. Springs are provided for biasing the locator members toward one another to a central position along the length of the shaft.

Mounting structure is provided which is fixed to and movable with the seat supporting channel. The mounting structure movably mounts the locator pin device. The pin device is locatable in an advanced position wherein the pin is associated with one of the location positions of the locator plate to position the seat supporting channel in a selected position. The pin is movable on the mounting structure from the advanced position to a retracted position. In the retracted position, the pin is withdrawn from a locator position but the pin is in juxtaposition with the locator plate whereby the pin can contact the projecting portion of either of the locator members. When the pin is brought into engagement with one of the members, the engaged member may be moved along the shaft if the shaft is rotated to a position so that the spacing blocks thereof are aligned with the secondary opening of the engaged member. Thus, an engaged on of the locator members may be repositioned between a different pair of the shaft's spacing blocks to direct the pin device into a different one of the location positions of the locator plate.

By using the structure of the invention, each of two vehicle operators may adjust one of the locator members to a position associated with his most desirable seat position. Thereafter, if the seat is not properly positioned when he enters the vehicle, he actuates the device and moves the seat until the locator pin engages the projecting portion of the locator member. Thereafter, the locator pin is directed into the proper location position and the seat is properly positioned.

In an alternate form, the invention also includes structure whereby the position of the vehicle seat may be changed to any one of the location positions along the length of the locator plate. In this instance, the locating pin does not engage either of the location members for automatic location of the seat supporting channel.

BRIEF DESCRIPTION OF THE DRAWINGS

FIG. 1 is a front elevation view of portions of a position locator for an adjustable seat supporting assembly formed in accordance with the teachings of this invention. The position locator is shown in a locked position.

FIG. 2 is a view of the position locator of FIG. 1 in an operated position permitting adjustment of a seat supporting channel to any of a plurality of seat position locations.

FIG. 4 is a bottom plan view of the position locator shown in FIG. 1. This view is taken along line 4—4 of FIG. 1.

FIG. 6 is a cross section view taken along line 6—6 of FIG. 1. This view shows, in detail, the mechanism for controlling the movement of the seat supporting channel.

DESCRIPTION OF THE PREFERRED EMBODIMENT

CONSTRUCTION

Figure 3:
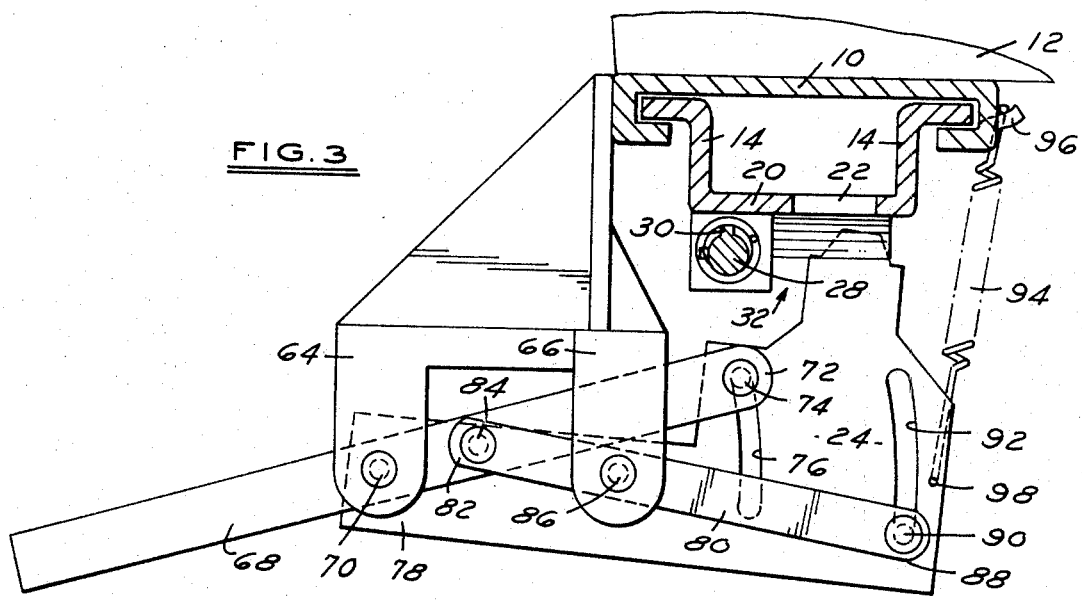
FIG. 3 is a view of the position locator of FIG. 1 in an operated position permitting adjustment of the seat supporting channel between selected seat location positions.

This invention is directed to a position locator for an adjustable seat supporting assembly. As seen in the Figures, a seat supporting channel 10 has a seat structure 12 secured thereto by any means known in the art. In actual construction, a single channel may be provided to support the seat 12 along a central portion thereof. Also, two channels may be employed for supporting the seat along opposite lateral edges thereof. When two channels are used, only one would have a position locator associated therewith. In the preferred embodiment described herein, a single seat supporting channel will be described.

As viewed in FIGS. 1, 2, 3 and 5, the seat supporting channel 10 is movable along an axis directed into and out of the drawing. In FIG. 4, the channel movement would be up and down as viewed in the drawing. This movement along a particular axis is employed in a motor vehicle in a direction along an axis toward the steering wheel of the vehicle. Movement of the seat 12 in a reverse direction along the axis causes the seat to be moved in a direction away from the steering wheel. Movement of the seat in the forward direction moves the seat toward the steering wheel. In most motor vehicles operated by several members of a family, the husband desires the seat to be spaced a substantially greater distance away from the steering column than does his wife. The structure to be described herein permits the husband to have a selected rear seat position and the wife to have a selected forward seat position for operation of the motor vehicle.

With reference to FIGS. 1, 2 and 3, a guide rail 14 is supported by a front leg 16 and a rear leg 18 (FIG. 4) on a base (not shown). The seat supporting channel 10 is movable along the rail 14 on a selected axis. The bottom portion of the guide rail forms a position locator plate 20 which has a plurality of openings 22 therein spaced equally along its length. These openings define a plurality of location positions along the locator plate. A locator pin 24 has a free end 26 designed for reception in a selected, individual one of the openings 22 (FIGS. 1 and 4).

A shaft 28 (FIG. 4) is rotatably mounted at opposite ends in the front leg 16 and the rear leg 18. The shaft has a plurality of spacing blocks 30 aligned and supported in a single row along its length. The spacing between adjacent ones of these spacing blocks is substantially equal. The blocks have about the same spacing therebetween as the openings 22 formed in the position locator plate 20.

Figure 7:
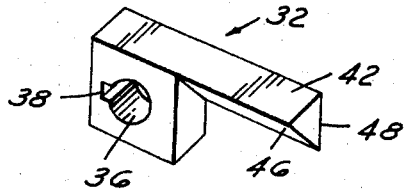
FIGS. 7 and 8 are perspective views of the two locator members utilized in conjunction with the position locator.
Figure 8:
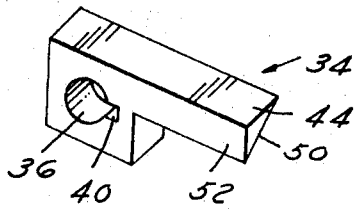

A front locator member, generally designated by the numeral 32, and a rear locator member, generally designated by the numeral 34, are received on the shaft 28 (FIG. 4). The members are individually illustrated in FIGS. 7 and 8. Each of these members has a thickness less then the space between adjacent ones of the spacing blocks 30 formed on the shaft 28. The members are, therefore, positionable between adjacent ones of the spacing blocks. Also, each of the members has a central opening 36 of a diameter slightly larger than the diameter of the shaft so that the shaft is rotatable therein. The front locator member 32 has a secondary opening 38 while the rear locator member 34 has a secondary opening 40. As seen in FIGS. 7 and 8, the secondary openings of the two members are spaced 180° of arc apart. Both of the secondary openings are designed so that they permit movement of the spacing blocks 30 of the shaft therethrough. This construction of the members permits them to be moved along the shaft individually when the shaft is rotated to such a position that the spacing blocks therealong are aligned with the secondary opening of an individual one of the locator members.

The front locator member 32 has a projecting portion 42. The rear locator member 34 also has a projecting portion 44. The projecting portion 42 of the front locator member has a tapering surface 46 and a guide surface 48. Similarly, the projecting portion 44 of the rear locator member has a tapering surface 50 and a guide surface 52. As best understood by viewing FIG. 4, when both of the locator members 32 and 34 are positioned on the shaft 28 between associated pairs of the spacing blocks 30, the projecting portions of the members are in juxtaposition with the openings 22 of the position locator plate 20. The guide surface 48 of the member 32 is aligned with a front one of the openings 22 of the locator plate. The guide surface 52 of the member 34 is aligned with a rear one of the openings 22. The positioning of the projecting portions of the members in juxtaposition with the locator plate serves to hold the members in a fixed angular attitude with respect to the shaft and permits the shaft to be rotated therein.

A front spring 54 is provided in a position encircling the shaft 28. The front spring acts between an end plate 56 secured to the shaft and the locator member 32. The spring applies a biasing force on the member which tends to move the member along the shaft in a direction toward a central portion of the shaft. Similarly, a rear spring 58 is provided which encircles the shaft. This rear spring acts between the rear leg 18 and the rear locator member 34 in order to apply a biasing force to the rear member. This biasing force causes movement of the rear member along the shaft toward a central portion of the shaft. A lock washer 60 secures the shaft in position for rotative movement in its supported position between the legs 16 and 18.

A mounting bracket 62 (FIGS. 1 to 3) has a pair of projecting fingers 64 and 66. The mounting bracket is secured by suitable fasteners (not shown) to the seat supporting channel 10 and is movable therewith.

An operating lever 68 has its midportion pivotably secured by a pivot pin 70 to the projecting finger 64 of the mounting bracket 62. An end 72 of the operating lever 68 supports a pin 74 thereon. The pin 74 is reciprocal in a first guide slot 76 formed in the locator pin 24. An end 78 of the locator pin 24 remote from the free end 26 thereof has an opening therein which is received about the pivot pin 70 such that the locator plate 24 is pivotable.

A second lever 80 has one end 82 thereof pivotably attached to an intermediate portion of the operating lever 68 by means of a pivot pin 84. An intermediate portion of the second lever 80 is pivotably secured by means of a pivot pin 86 to the second projecting finger 66 of the mounting bracket 62. The other end 88 of the lever 80 is secured by means of a pin 90 to a second guide slot 92 formed in the locator pin 24. A spring 94 has one end thereof secured to a mounting post 96 formed on the seat supporting channel 10 and the other end thereof secured to an opening 98 formed on the locator pin. This spring bias the locator pin to a normal position with its free end 26 received in one of the openings 22 of the locator plate 20.

The operating lever 68 is movable from its normal position (FIG. 1) upwardly which causes movement of the various elements of the mechanism to a position shown in FIG. 2. In this position the locator pin is movable along the length of the locator plate without having its free end 26 brought into engagement with either the projecting portion 42 or 44 of the locator members 32 and 34, respectively. The operating lever 68 is also movable downwardly to a position wherein the free end 26 of the locator pin 24 is retracted from the opening 22 of the locator plate 20 only a slight distance (FIG. 3). When in this condition, movement of the locator pin along the length of the locator plate will bring its free end 26 into engagement with the projecting portion of one or the other of the two locator members.

OPERATION

When a vehicle having the seat assembly formed in accordance with the teachings of this invention is new, the locator members 32 and 34 would generally be in a position such as illustrated in phantom in FIG. 4. A short driver would adjust the front locator member 32 to a proper setting for him whereas a tall driver would adjust the rear locator member 34 to a proper portion for him. The adjustment of the locator members is accomplished in the following manner.

Figure 5:
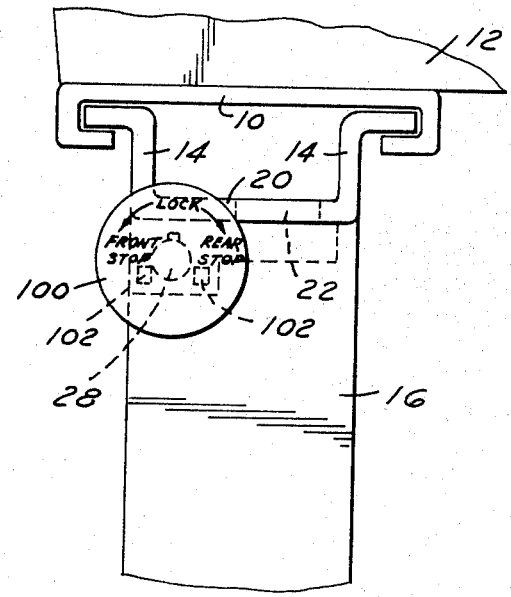
FIG. 5 is a front elevation view of a portion of the position locator of FIG. 1. This view shows, in detail, the device for setting locator members of the position locator.

A knob 100, secured to the shaft 28, is rotated to the left as viewed in FIG. 5 till the leading most spacing block 30 on the shaft comes into contact with one of a pair of stop members 102—102 which are secured to the front leg 16. Bringing of the shaft to this position aligns the spacing blocks 30 therealong with the secondary opening 38 of the front locator member 32.

Once the knob rotates the shaft 28 to such an aligned position, the person desiring to adjust the seat supporting channel 10 depresses the lever 68 (FIG. 3). Downward movement of the operating lever 68 causes its free end 72 to be moved upwardly to the top of the first guide slot 76 of the pin 24. Such movement causes the second lever 80 to remain in a position that its end 88 stays in the bottom of the second guide slot 92 of the locator pin. The travel of the free end 72 of the operating lever 68 and the end 88 of the second lever 80 to opposite ends of the two guide slots causes the retraction of the free end 26 of the locator pin from one of the openings 22 of the locator plate 20. However, the retraction of the free end is limited so that the path of travel of the free end will bring it into contact with the guide surface 48 of the projecting portion 42 of the locator member 32.

With the knob 100 rotated to an aligned position for resetting the locator member 32, the spring 54 acts on the locator member 32 to bias it toward a central position on the shaft 28. Thus, the person operating the device with the operating lever 68 depressed is able to move the locator pin 24 to a new desired position wherein the free end 26 thereof is aligned with a selected opening 22 in the locator plate 20. When this new position is achieved, the spring 54 is acting on the locator member 32 to bring its guide surface 48 into contact with the free end 26 of the locator pin. This action brings the member between an adjacent, selected pair of the spacing blocks 30 of the shaft. When the new desired position is achieved, the locator pin is associated with a selected opening of the locator plate and the locator member is positioned between a new pair of spacing blocks. At this time, the shaft 28 is returned to its normal position by rotating the knob 100. This action locks the locator member between the blocks. Thereafter, whenever the seat is returned to that selected position, the guide surface 48 of the front locator member 32 will engage and direct the free end 26 of the pin into the proper opening 22 of the locator plate.

The guide member 34 may be similarly adjusted. However, when adjusting this member it is necessary to rotate the knob 100 to the right as viewed in FIG. 5 in order to align the spacing blocks of the shaft with the secondary opening 40 of the rear locator member 34. Once the rear locator member has been properly positioned, it can always be employed for relocating this rear position.

As described to this point, the seat locator device of this invention may be employed so that a tall person may adjust the rear locator member and a short person may adjust the front locator member. Once the locator members are adjusted, the movement between the two positions is accomplished by depressing the operating lever 68 as seen in FIG. 3 in order to withdraw the free end 26 of the locator pin 24 from an associated opening 22 of the locator plate 20. Once withdrawn, the seat channel 10 may be moved. This action moves the free end of the pin to engage the projecting portion of the other locator member. Once the other locator member is engaged the operating lever 68 is released and the spring 94 acts to draw the free end of the pin into the newly selected opening 22. This properly relocates the seat to the new desired position.

It sometimes occurs that the vehicle is driven by a person who cannot comfortably operate the vehicle with the seat in either the front or the rear position or in a position intermediate thereof. In such a case, it is necessary to move the seat to a position either in front or behind the front or rear locator members respectively. Such a movement is accomplished with the structure of this invention as follows.

If the seat is to be adjusted to an extreme front or rear position, the operating lever 68 is moved upwardly as viewed in FIG. 2. Upward movement of the operating lever causes the free end 72 and the pin 74 thereon to be moved to the bottom of the first guide slot 76 of the locator pin 24. Similarly, this upward movement of the operating lever 68 causes the free end 88 of the second lever 80 and its associated pin 90 to be moved to the top of the second guide slot 92 of the locator pin 24. When the two levers achieve these conditions, the free end 26 of the locator pin 24 is retracted a substantial distance from the locator plate 20. The free end 26 is retracted sufficiently so that it passes by the projecting portions of the locator members and is not thereby restricted to movement between the two members. Thus, the seat may be adjusted to any position outside of those positions between the locator members. When a person who has one of the locator members adjusted to a fixed position then uses the vehicle, this person depresses the operating lever 68 as viewed in FIG. 3 and moves the seat toward its desired locator member. The free end 26 of the locator pin 24 which has gone beyond its normal position, will engage either the tapering surface 46 or the tapering surface 50 of the locator members 32 or 34 on its movement to the desired locator member. The tapering surface cams the pin downwardly in order to permit the pin to pass over the projecting portion of the engaged locator member and once again achieve a position between the members.

There has been disclosed herein a locating mechanism for an adjustable seat assembly. In view of the teachings of this specification, many modifications of the invention will be apparent to those skilled in the art. It is intended that all such modifications which fall within the true spirit and scope of this invention be included within the scope of the appended claims.

What we claim is:

1. A position locator for an adjustable seat supporting assembly which comprises:
   a seat supporting channel;
   a guide rail;
   support means for supporting said guide rail in a position such that said seat supporting channel may move therealong;
   a position location plate supported by said supporting means adjacent said guide rail, said plate having a plurality of location positions thereon equally spaced along its length;
   a locator pin means for association with a selected one of said location positions of said locator plate;
   a shaft rotatably supported on said support means in such a position that said shaft extends in its length dimension along the length of said guide rail;
   a plurality of spacing blocks aligned and supported in a single row along the length of said shaft, said spacing blocks being spaced from one another by substantially equal distances and being aligned with said location positions of said locator plate;
   a pair of locator members received on said shaft, each of said members having (1) a thickness less than said space between adjacent ones of said spacing blocks so that said members are positionable between associated pairs of said blocks, (2) a central opening therethrough of a diameter slightly larger than the diameter of said shaft, (3) a secondary opening connected to said central opening, said secondary opening being of sufficient size to permit movement of said spacing blocks therethrough thus permitting the shifting of said members along the length of said shaft when said blocks are aligned with said secondary openings thereof, and (4) a projecting portion extending to a position in juxtaposition with a portion of said position location plate having said location positions thereon, said positioning of said projecting portion with respect to said position location plate acting to retain said locator member in a fixed attitude with respect to said location plate even though said shaft is rotated in said central opening thereof, said projecting portion also directing said pin means into association with a selected one of said locator positions of said locator plate with which said projecting portion is in juxtaposition, said secondary openings of said locator members not being aligned with one another when said members are on said shaft whereby said shaft has to be in one angular attitude to permit movement of one locator member therealong, and whereby said shaft has to be in a different angular attitude to permit movement of the other locator member therealong;

spring means for biasing said locator members toward one another to a central position along the length of said shaft; and mounting means fixed to and movable with said seat supporting channel, said mounting means for movably mounting said locator pin means for movement between an advanced position wherein said pin means is associated with one of said location positions of said locator plate thereby to position said seat supporting channel in a selected position, and a retracted position wherein said pin means is in a position withdrawn from said association but in juxtaposition with said plate whereby said pin means can be brought into engagement with said projecting portion of either of said locator members, said pin means being able to move an engaged one of said members along said shaft against the bias of spring means if said shaft is rotated to such a position that said spacing blocks thereof are aligned with said secondary opening of said engaged locator member whereby said locator member may be repositioned between a different pair of said spacing blocks to direct said pin means into a different one of said location positions of said locator plate.

2. The position locator as defined in claim 1 wherein: said position locator plate is formed as a portion of said guide rail; wherein said location positions of said locator plate are openings formed in said plate; and wherein said pin means has a free end portion for reception in a selected one of said opening of said locator plate to position said seat supporting channel.

3. The position locator as defined in claim 2 wherein: said mounting means also is for movably mounting said locator pin means for movement to a second retracted position wherein said pin means is withdrawn from said openings of said locator plate to a position spaced sufficiently from said locator plate that said pin means will not engage said projecting positions of said locator members when said pin means is moved along the length of said shaft.

4. The position locator as defined in claim 3 wherein: said pin means is a plate member having said free end portion for reception in one of said openings of said locator plate; wherein said mounting means includes support structure to which said plate member is secured for pivotable movement of its said free end; and wherein said mounting means also includes lever means, in part secured to said plate member and in part secured to said support structure, for moving said free end of said plate member between its advanced position and its retracted positions.

5. The position locator as defined in claim 4 wherein: a spring is secured at one end to a portion of said seat supporting channel and at its other end to a portion of said plate member to bias said plate member to its advanced position wherein said free end thereof is received in one of said openings of said locator plate.

6. The position locator as defined in claim 5 wherein: said secondary openings in each of said locator members are spaced 180° of arc away from one another.

7. The position locator of claim 6 wherein: stop means are provided on said guide rail supporting means for engaging an end one of said spacing blocks of said shafts to limit the angular displacement of said shaft to such positions whereat said spacing blocks thereon are aligned with one of said secondary openings of said locator members.

8. A position locator for a seat structure which is adjustable along an axis to one of several positions, said locator and adjustable seat structure comprising:

a guide rail including a portion thereof forming a locator plate having a plurality of openings equally spaced along its length;

a pair of support legs mounting said guide rail and locator plate along an axis;

a seat supporting channel mounted for movement on said guide rail;

a shaft having a plurality of spacing blocks thereon aligned in a single row along a portion of its length, said blocks being spaced from one another by substantially equal distances equal to the spacing of said openings of said locator plate;

means for rotatably mounting said shaft on said support legs with said spacing blocks of said shaft being positioned between said support legs and in alignment with said openings of said locator plate;

stop members secured to one of said support legs adjacent an end one of said spacing blocks of said shaft, each stop member engaging the said one spacing block when said shaft is rotated 90° of arc in a particular direction from a normal shaft position thereby to control angular displacement of the shaft to selected amounts;

a locator pin having a free end sized to be received in a selected one of said openings of said locator plate;

a pair of locator members received on said shaft, each of said members having (1) a thickness less than the space between adjacent ones of said spacing blocks so that said members are positionable between associated ones of said spacing blocks, (2) a central opening therethrough of a diameter slightly larger than the diameter of said shaft, (3) a secondary opening connected to said central opening, said secondary opening being of sufficient size to permit movement of said spacing blocks therethrough thus permitting the shifting of said members along the length of said shaft when said blocks are aligned with said secondary opening thereof, and (4) a projecting portion extending to a position in juxtaposition with a portion of said position locating plate having said openings therein, said positioning of said projecting portion with respect to said position locating plate acting to retain said locator member in a fixed attitude with respect to said locator plate even though said shaft is rotated in said central opening thereof, said projecting portion also directing said locator pin into association with a selected one of said openings of said locator plate with which said projecting portion is in juxtaposition, said secondary opening of said member being spaced 180° of arc from one another;

a pair of springs, each of said springs being placed in a position encircling said shaft between one of said support legs and one of said locator members for biasing said members to a normal position toward the center of the length of said shaft; and mounting means secured to said seat supporting channel for pivotably mounting said locator pin so that said free end thereof is movable from an advanced position within one of said openings of said locator plate to either one of two retracted positions wherein said free end either engages or misses said projecting portion of said locator member, said pin being capable of moving an engaged one of said locator members along said shaft when said spacing blocks of said shaft are aligned with said secondary opening of said engaged member whereby said engaged locator member may be repositioned between a different associated pair of said spacing blocks to direct said locator pin into a different one of said openings of said locator plate.

9. The position locator as defined in claim 8 wherein: said mounting means includes support structure to which said locator pin is secured for pivotable movement of its said free end; and wherein said mounting means also includes lever means, in part secured to said locator pin and in part secured to said support structure, for moving said free end of said locator pin between its advanced position and its retracted position.

10. The position locator as defined in claim 9 wherein: a spring is secured at one end to a portion of said seat supporting channel and at its other end to a portion of said locator pin to bias said locator to its advanced position wherein said free end thereof is received in one of said openings of said locator plate.

* * * * *